United States Patent
Diop et al.

(10) Patent No.: US 9,490,577 B2
(45) Date of Patent: Nov. 8, 2016

(54) AUTOMATIC SPLICE HAVING AN ARM INDICATOR

(71) Applicant: Hubbell Incorporated, Shelton, CT (US)

(72) Inventors: Seydou Diop, Birmingham, AL (US); Paul Zelazny, Moody, AL (US)

(73) Assignee: Hubbell Incorporated, Shelton, CT (US)

( * ) Notice: Subject to any disclaimer, the term of this patent is extended or adjusted under 35 U.S.C. 154(b) by 0 days.

(21) Appl. No.: 14/154,866

(22) Filed: Jan. 14, 2014

(65) Prior Publication Data

US 2014/0273609 A1    Sep. 18, 2014

Related U.S. Application Data

(60) Provisional application No. 61/794,436, filed on Mar. 15, 2013.

(51) Int. Cl.
*H01R 3/00* (2006.01)
*H01R 13/641* (2006.01)
*H01R 4/50* (2006.01)
*H02G 1/14* (2006.01)

(52) U.S. Cl.
CPC .......... *H01R 13/641* (2013.01); *H01R 4/5083* (2013.01); *H02G 1/14* (2013.01)

(58) Field of Classification Search
CPC ..... H01R 13/62; H01R 13/641; H01R 13/52
USPC ........................................ 439/489, 345, 488
See application file for complete search history.

(56) References Cited

U.S. PATENT DOCUMENTS

| | | |
|---|---|---|
| 2,572,940 A | 10/1951 | Lockhart |
| 3,072,989 A | 1/1963 | Jugle et al. |
| 5,278,353 A | 1/1994 | Buchholz |
| 5,683,273 A | 11/1997 | Garver |
| 6,773,311 B2 | 8/2004 | Mello |
| 7,219,399 B2 | 5/2007 | Tamm |
| 7,799,996 B2 | 9/2010 | Tamm |
| 8,221,155 B2 | 7/2012 | Luzzi |
| 8,672,699 B2 * | 3/2014 | Gaertner ............... H01R 4/28 439/345 |
| 9,054,445 B2 * | 6/2015 | O'Sullivan ........... H01R 13/62 |
| 9,054,446 B2 * | 6/2015 | O'Sullivan ........... H01R 13/62 |
| 2007/0238336 A1 | 10/2007 | Frederiksen et al. |
| 2011/0183539 A1 * | 7/2011 | Gaertner ............. H01R 13/641 439/345 |
| 2012/0217062 A1 | 8/2012 | Cawood |

* cited by examiner

*Primary Examiner* — Abdullah Riyami
*Assistant Examiner* — Nader J Alhawamdeh
(74) *Attorney, Agent, or Firm* — Michael Best & Friedrich, LLP

(57) ABSTRACT

A cable connector includes a body member having a first opening to receive a cable and a second opening. An indicator is movable between first and second positions. A stop member substantially prevents unintended movement of the indicator from the first position to the second position. The indicator moves past the stop member and through the second opening in the body member when moving from the first position to the second position and is exposed externally of the body member to indicate full insertion of the cable.

20 Claims, 10 Drawing Sheets

AUTOMATIC SPLICE HAVING AN ARM INDICATOR

CROSS REFERENCE TO RELATED APPLICATION

This application claims the benefit under 35 U.S.C. §119 (e) of U.S. Provisional Application Ser. No. 61/794,436, filed Mar. 15, 2013, which is hereby incorporated by reference in its entirety.

FIELD OF THE INVENTION

The present invention relates generally to a cable connector splice for electrically and mechanically connecting first and second cables. More particularly, the present invention relates to a cable connector indicating full insertion of a cable therein. Still more particularly, the present invention relates to a cable connector in which an indicator is pivoted out of the connector upon full insertion of a cable.

BACKGROUND OF THE INVENTION

Splicing connectors for electrical cables and conductors have long been known, and are used by utility linemen to quickly splice lengths of suspended cable together. The splicing connectors, commonly referred to as automatic splices, have become a mainstay in the electrical utility industry. Originally developed for "emergency restoration", automatic splices have evolved into a standard construction component for overhead power lines, and have been extensively used in the industry.

A problem associated with existing automatic splices is the lack of an indication that the electrical conductors have been fully inserted in the automatic splices. Without such indication, the conductors can be partially inserted, such that the conductors are not properly spliced together. Failure to fully insert a conductor in the splice can result in the conductor slipping out of the splice, which could take time to occur, thereby creating a highly dangerous environment. Accordingly, a need exists for an automatic splice that indicates that conductors have been fully inserted in the splice.

Another problem associated with existing automatic splices is that a large force is required to insert the conductors. The location of the automatic splice can make it difficult for the lineman to assert the required installation force, such that repeated efforts can be required to fully insert the conductors. An improperly inserted conductor can slip out of the splice, thereby creating a highly dangerous environment. Accordingly, a need exists for an automatic splice that reduces the insertion force required to insert conductors.

SUMMARY OF THE INVENTION

An object of the present invention is to provide an improved cable connector for electrically and mechanically connecting first and second cables.

Another object of the present invention is to provide a cable connector that indicates when first and second cables are fully inserted.

Still another object of the present invention is to provide a cable connector that reduces the force required to insert first and second cables.

The foregoing objectives are basically attained by a cable connector including a body member having a cable opening to receive a cable and an indicator opening. An indicator is movable between first and second positions. A stop member releasably engages and substantially prevents unintended movement of the indicator from the first position to the second position. The indicator moves past the stop member and through the indicator opening in the body member when moving from the first position to the second position and is exposed externally of the body member to indicate full insertion of the cable.

The foregoing objectives are also basically attained by a cable connector including a body member having a cable opening to receive a cable and an indicator opening. A centerstop is disposed in the body member and has a pivot member. An indicator is movably connected to the pivot member and pivotable between first and second positions. A stop member connected to the centerstop releasably engages and substantially prevents unintended movement of the indicator from the first position to the second position. The indicator pivots past the stop member and through the indicator opening in the body member when moving from the first position to the second position and is exposed externally of the body member to indicate full insertion of the cable.

The foregoing objectives are also basically attained by a cable connector including a body member having a cable opening to receive a cable and an indicator opening. A centerstop is disposed in the body member and has a pivot member. An indicator is movably connected to the pivot member and pivotable between first and second positions. A stop member connected to the centerstop to releasably engages and substantially prevents unintended movement of the indicator from the first position to the second position. The indicator pivots past the stop member and through the second opening in the body member when moving from the first position to the second position and is exposed externally of the body member to indicate full insertion of the cable. A jaw assembly is movably disposed in the body member between a first position and a second position and receives an inserted cable. A spring member is movably disposed in the body member between the centerstop and the jaw member. The spring member biases the jaw assembly to the second position.

Other objects, advantages and salient features of the invention will become apparent from the following detailed description, which, taken in conjunction with the annexed drawings, discloses a preferred embodiment of the invention.

As used in this application, the terms "front," "rear," "upper," "lower," "upwardly," "downwardly," and other orientational descriptors are intended to facilitate the description of the exemplary embodiments of the present invention, and are not intended to limit the structure of the exemplary embodiments of the present invention to any particular position or orientation.

BRIEF DESCRIPTION OF THE DRAWINGS

The above aspects and features of the present invention will be more apparent from the description for the exemplary embodiments of the present invention taken with reference to the accompanying drawings, in which.

Throughout the drawings, like reference numerals will be understood to refer to like parts, components and structures.

DETAILED DESCRIPTION OF EXEMPLARY EMBODIMENTS

A cable connector, or automatic splice, 1 in accordance with an exemplary embodiment of the present invention includes a body member 2 having a cable opening to receive a cable 12 and an indicator opening 7. An indicator 27 is received in the indicator opening 7 and is movable between unexposed and exposed positions.

Figure 1:
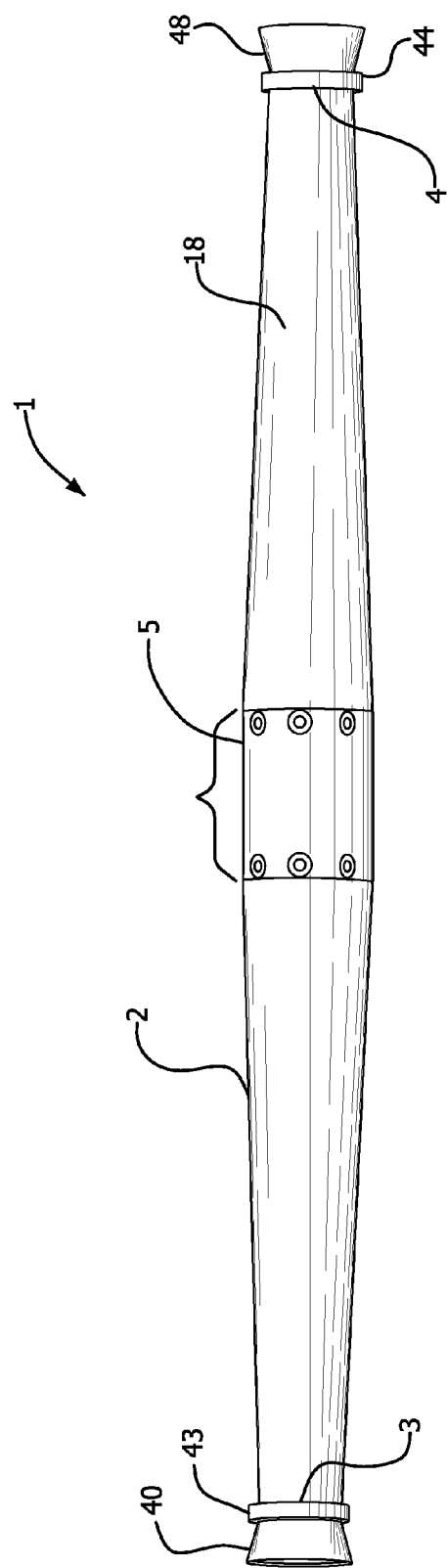
FIG. 1 is a side elevational view of a cable connector in accordance with an exemplary embodiment of the present invention.
Figure 2:
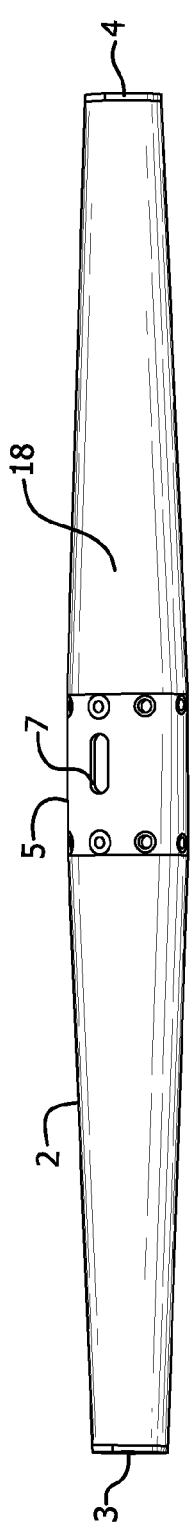
FIG. 2 is a top plan view of a tube of the cable connector of FIG. 1.
Figure 4:
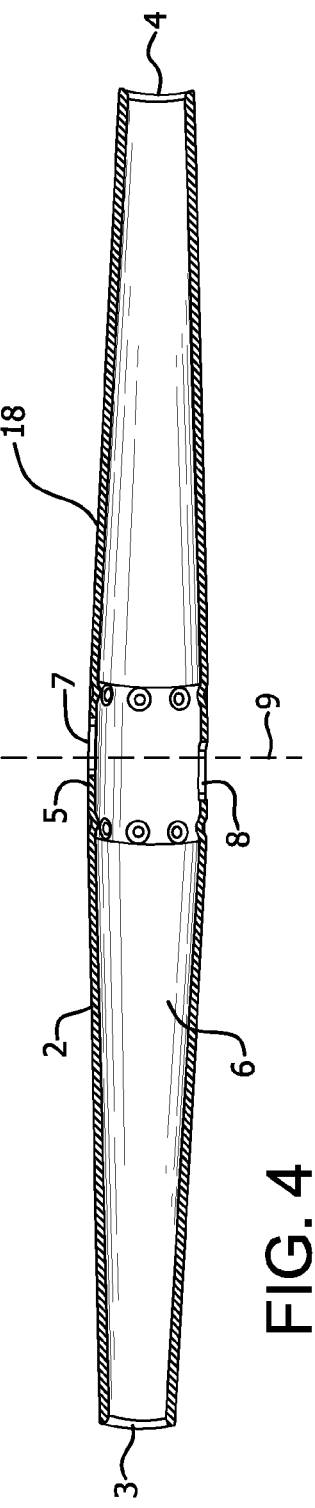
FIG. 4 is a side elevational view in cross-section of the cable connector of FIG. 1 showing offset slots in the tube.
Figure 5:
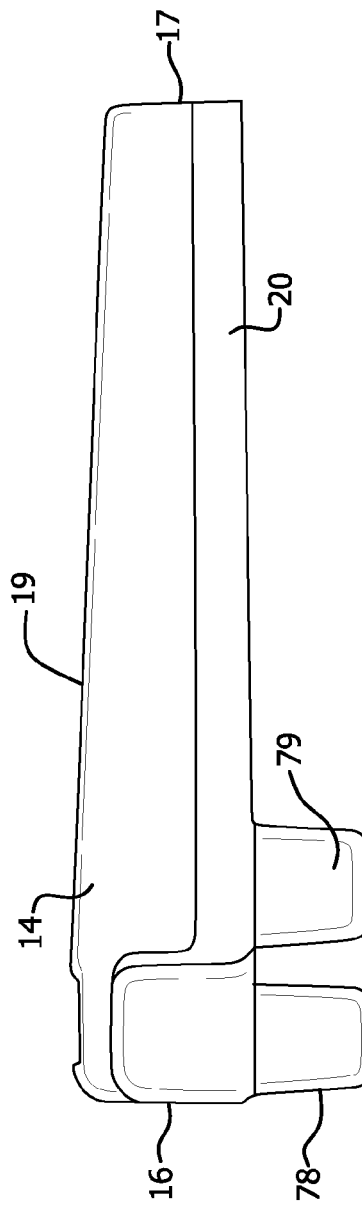
FIG. 5 is a side elevational view of a jaw member of a jaw assembly of the cable connector of FIG. 1.
Figure 6:
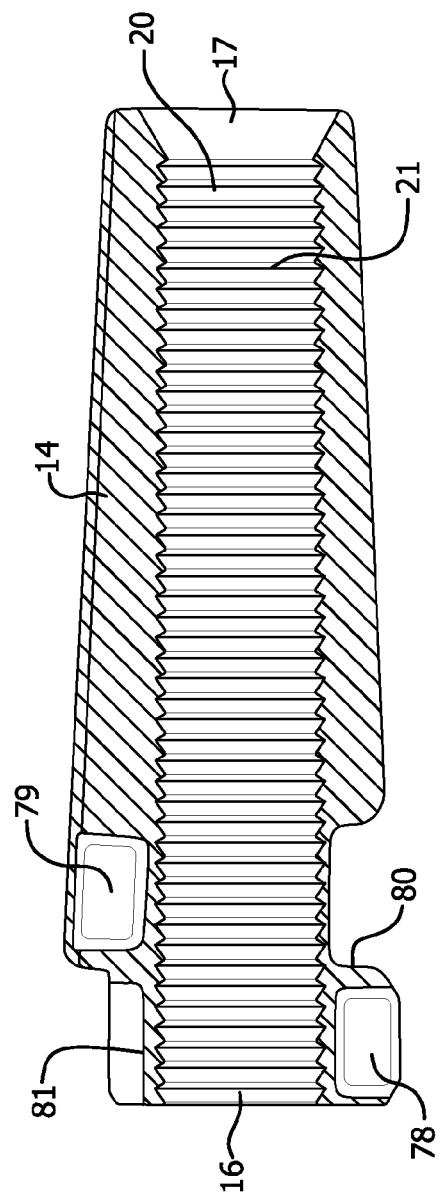
FIG. 6 is a top plan view in cross section of the jaw member of FIG. 5.

The swaged tube, or body member, 2 has first and second ends 3 and 4, as shown in FIGS. 1, 2 and 4. The tube 2 has a center portion 5 having a substantially constant diameter. The diameter of the tube 2 decreases and tapers internally from the center portion 5 toward each of the first and second ends 3 and 4, as shown in FIG. 4. A cavity 6 is defined by the tube 2 between the first and second ends 3 and 4. A plurality of dimples 24 extend inwardly from the center portion 5 of the tube. As shown in FIGS. 1, 2 and 4, first and second sets of dimples extend circumferentially around the tube on opposite sides of first and second indicator openings 7 and 8. The tube is preferably made of aluminum, although any suitable material can be used.

As shown in FIGS. 2 and 4, the first and second fastener slots, or indicator openings, 7 and 8 are formed in the center portion 5 of the tube 2. The first and second indicator openings 7 and 8 are diametrically opposed and offset with respect to an axis 9 through the center of the tube 2 perpendicular to a longitudinal axis of the tube. The indicator openings, 7 and 8 extend through the tube 2 from an outer surface 18 to the cavity 6.

Figure 3:
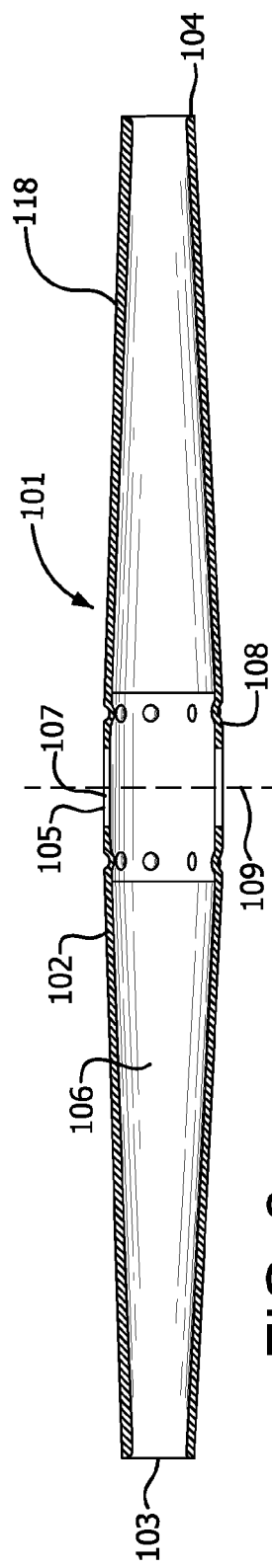
FIG. 3 is a side elevational view in cross-section showing diametrically opposed slots in the tube according to an alternative embodiment.

Alternatively, as shown in FIG. 3, first and second indicator openings 107 and 108 are formed in a center portion 105 of a tube 102 of a cable connector 101. The first and second indicator openings 107 and 108 are diametrically opposed and centered on an axis 109 through the center of the tube 102. The indicator openings 107 and 108 extend through the tube 102 from an outer surface 118 to a cavity 106.

Gripping jaw assemblies 10 and 11 are disposed in the cavity 6 on opposite sides of the center portion 5 of the tube for retaining first and second cables 12 and 13, as shown in FIGS. 5, 6, 17 and 23. The first and second jaw assemblies 10 and 11 are substantially identical. Each of the jaw assemblies 10 and 11 includes first and second jaw members 14 and 15, which are preferably substantially identical. The jaw member 14 has first and second ends 16 and 17. An outer surface 19 of the jaw member 14 tapers inwardly from the first end 16 to the second end 17. An inner surface 20 of the jaw member 14 has teeth to facilitate engaging the inserted cables 12 and 13. First and second tabs 78 and 79 are disposed on opposite sides of the teeth 21 of the jaw member 14 and extend outwardly from the inner surface 20. A first recess 80 is disposed rearwardly of the first tab 78, and a second recess 81 is disposed forwardly of the second tab 79. The tabs and recesses of the first jaw member 14 engage corresponding tabs and recesses of the second jaw member 15. The jaw assemblies 10 and 11 retain the cables 12 and 13 in the tube 2 such that when a force is applied to retract the cables 12 and 13, the force of the jaw assemblies 10 and 11 increases as applied against the cables 12 and 13. The jaw members are preferably made of an aluminum alloy, although any suitable material can be used.

Figure 20:
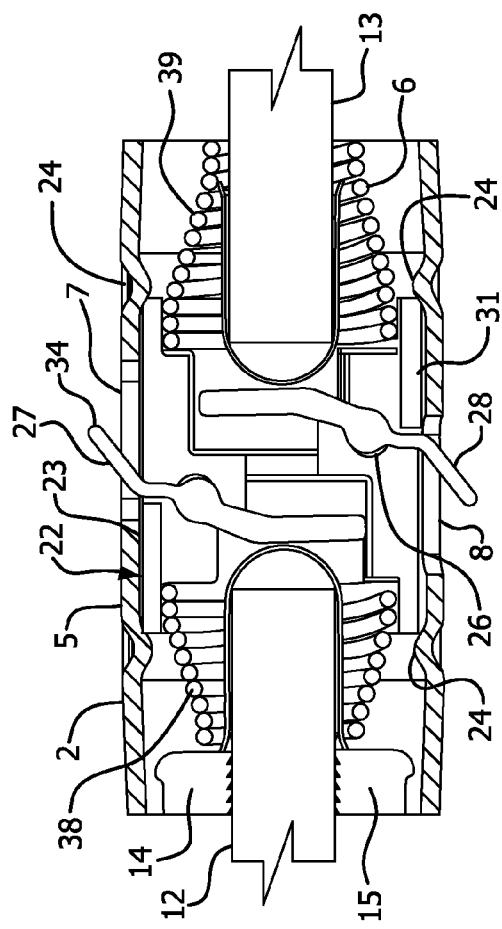
FIG. 20 is a partial side elevational view in cross-section of the cable connector of FIG. 13 showing exposed indicator arms.
Figure 17:
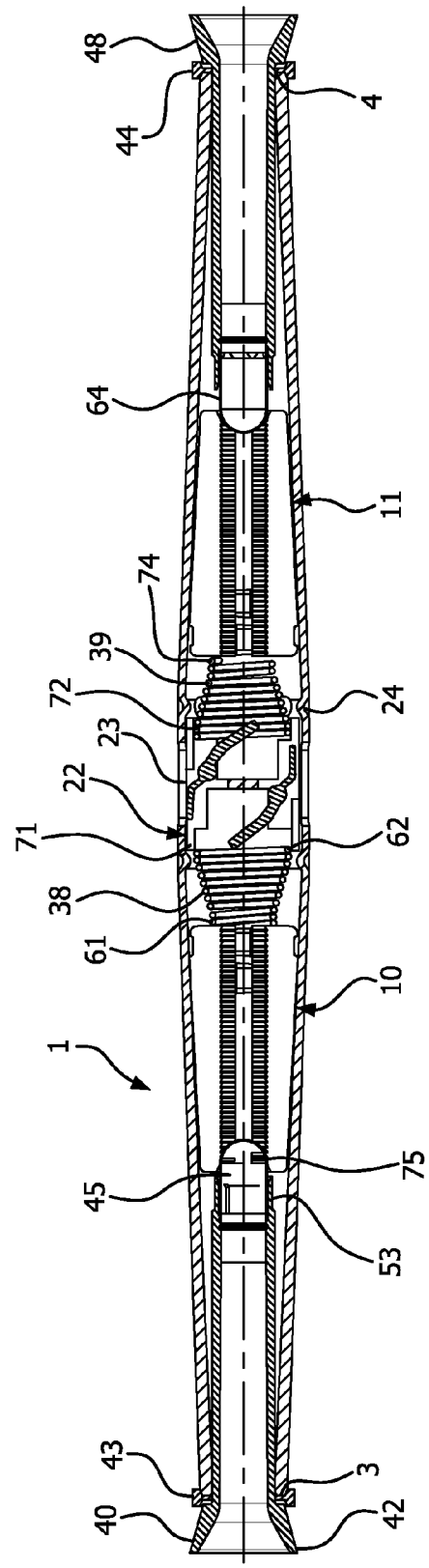
FIG. 17 is a side elevational view in cross-section of the cable connector of FIG. 1 prior to insertion of a cable.
Figure 18:
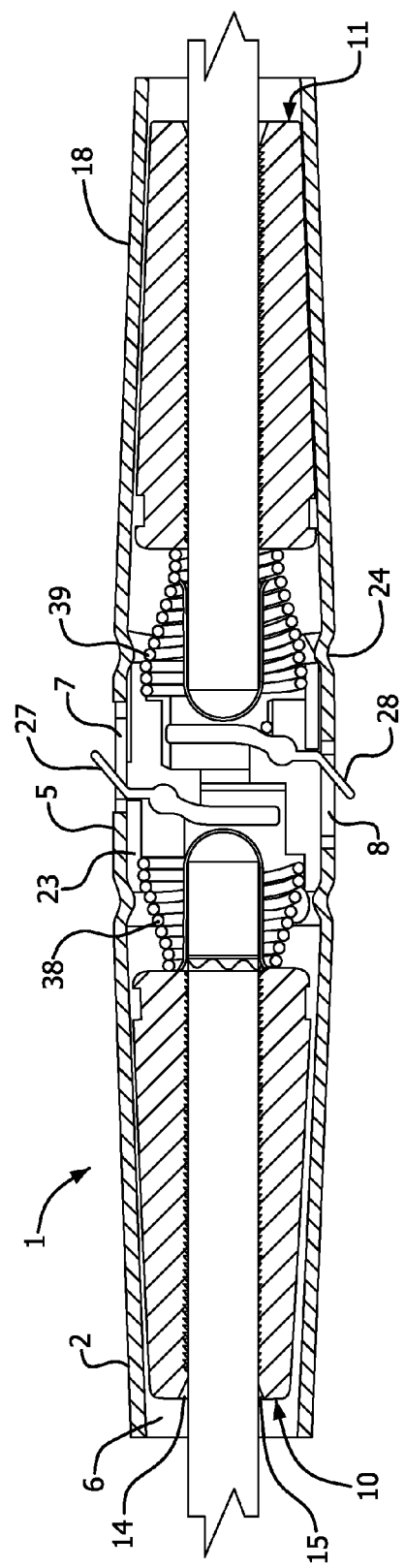
FIG. 18 is a partial side elevational view in cross-section of the cable connector of FIG. 1 in which cables are fully inserted and prior to expansion of a spring member.

A centerstop assembly 22 is disposed in the center portion 5 of the tube 2, as shown in FIGS. 17, 18 and 20. The centerstop assembly 22 includes a centerstop 23, first and second spring members 38 and 39, and first and second indicators 27 and 28.

Figure 9:
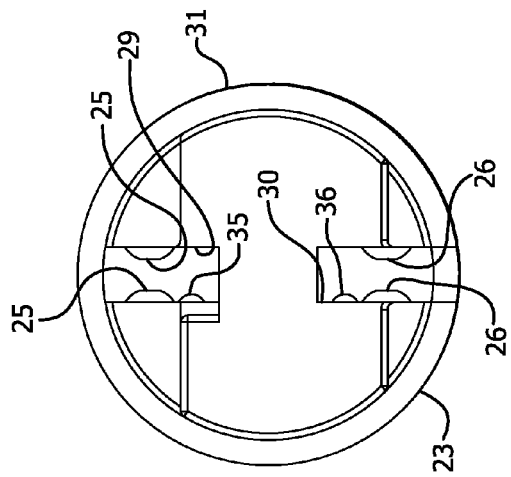
FIG. 9 is a front elevational view of the centerstop of FIG. 7.
Figure 8:
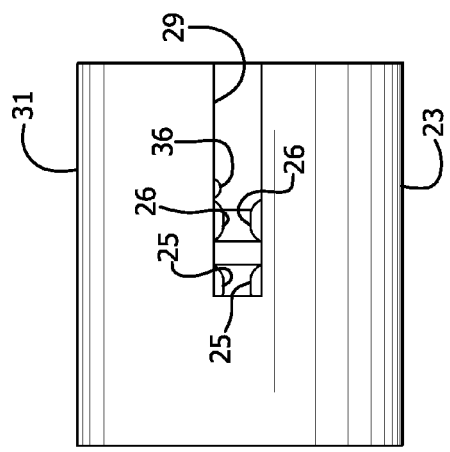
FIG. 8 is a top plan view of the centerstop of FIG. 7.
Figure 7:
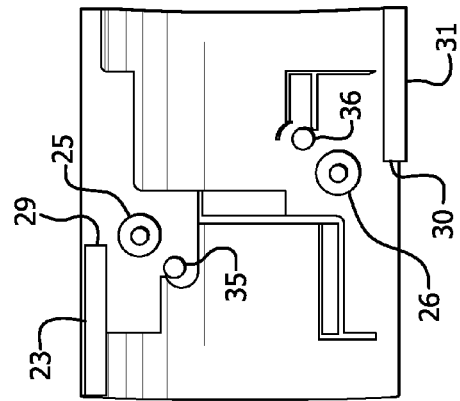
FIG. 7 is a side elevational view in cross-section of a centerstop of the cable connector of FIG. 1.
Figure 12:
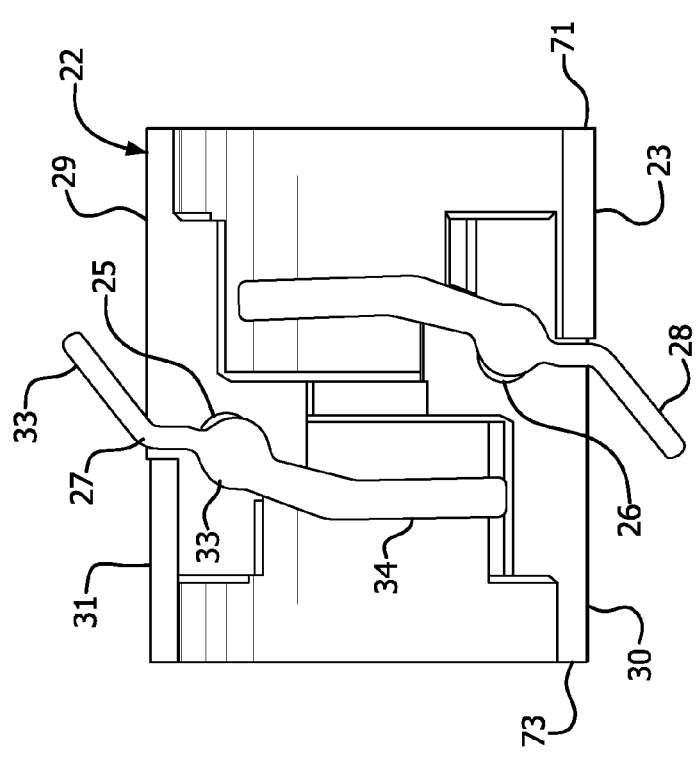
FIG. 12 is a side elevational view in cross-section of the centerstop assembly of the cable connector of FIG. 1.

The centerstop 23, as shown in FIGS. 7-9, includes first and second pairs of ball members 25 and 26 that receive first and second arm members 27 and 28, as shown in FIG. 12. Slots 29 and 30 are formed in a side wall 31 of the centerstop 23 to allow for pivotal movement of the first and second arm members 27 and 28 about the first and second pairs of ball members 25 and 26. As shown in FIGS. 8 and 20, the first and second pairs of ball members 25 and 26 are spaced from one another in a longitudinal direction of the tube 2. First and second stop members 35 and 36 are disposed in the centerstop 23, as shown in FIGS. 7-9. The first stop member 35 is disposed radially inwardly of the first pair of ball members 25 and the second stop member 36 is disposed radially inwardly of the second pair of ball members 26, as shown in FIGS. 7 and 9. The centerstop is preferably made of plastic, although any suitable material can be used.

Figure 11:
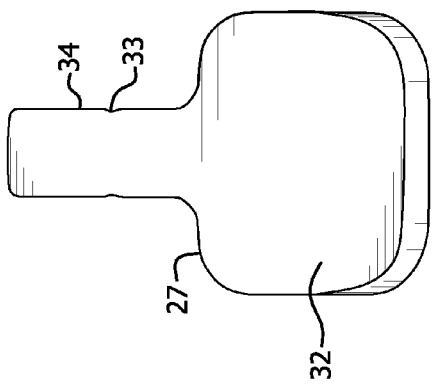
FIG. 11 is a top plan view of the arm of FIG. 10.
Figure 10:
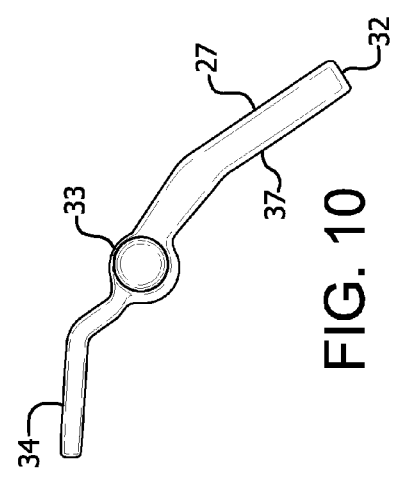
FIG. 10 is a side elevational view of an indicator arm of the centerstop assembly of the cable connector of FIG. 1.

The first and second indicators, or arm members, 27 and 28 are pivotally disposed in the centerstop 23, as shown in FIGS. 17 and 23. The second arm member 28 is substantially identical to the first arm member 27. The first arm member 27, as shown in FIGS. 10 and 11, has a substantially planar pad portion 32 extending from an arm 34. A socket portion 33 is disposed in the arm 34. As shown in FIG. 11, the socket portion 33 has sockets formed on opposite sides of the arm 34. The socket portion 33 of the first arm member 27 is received between the first pair of ball members 25 of the centerstop 23, as shown in FIG. 12. The socket portion of the second arm member 28 is received between the second pair of ball members 26. Preferably, the first and second arm members 27 and 28 are made of plastic, although any suitable material can be used.

Figure 13:
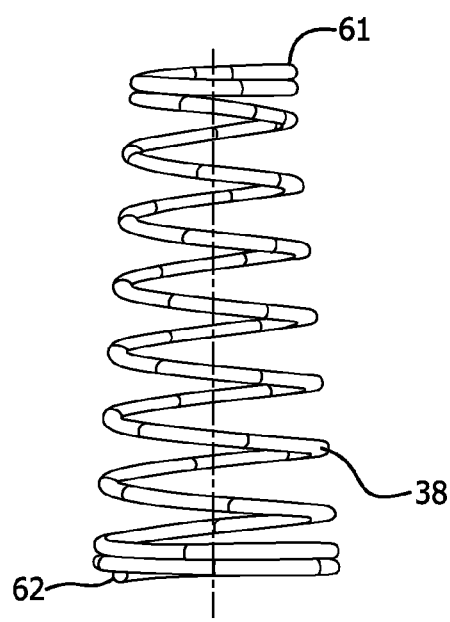
FIG. 13 is a front elevational view of a spring member of the cable connector of FIG. 1.

First and second spring members 38 and 39, as shown in FIG. 17, are disposed between each of the jaw assemblies 10 and 11 and the centerstop 23. The first and second spring members 38 and 39 are preferably substantially identical. The first spring member 38 has a first end 61 connected to the centerstop 23 and a second end 62 connected to the first end 16 of the first jaw assembly 10. The second spring member 39 extends between the centerstop 23 and the first end of the second jaw assembly 11. Preferably, the spring member is a tapered helical spring, as shown in FIG. 13, such that the first end 61 has a smaller diameter than the second end 62. Two substantially planar coils, i.e., having substantially zero pitch, are preferably disposed at each end of the spring member to increase the stiffness thereof.

Figure 14:
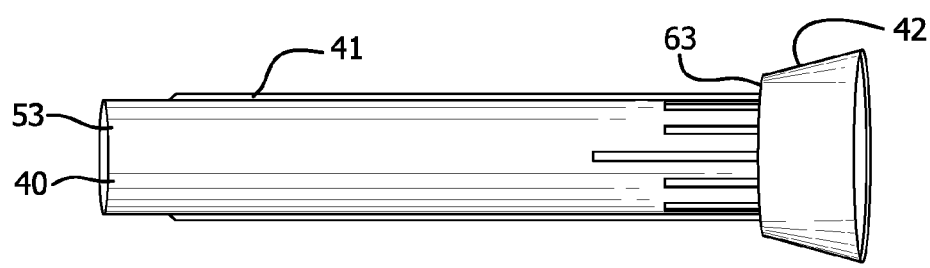
FIG. 14 is a side elevational view of a funnel guide of the cable connector of FIG. 1.

First and second funnel guides 40 and 48 are disposed on opposite sides of the center portion 5 of the tube 2, as shown in FIGS. 1, 17 and 21-23. The second funnel guide 48 is substantially identical to the first funnel guide 40. The funnel guide 40 has a tubular portion 41 and a substantially frusto-conical end portion 42 connected thereto, as shown in FIG. 14. A shoulder 63 is formed between the tubular portion 41 and the substantially frusto-conical end portion 42. The tubular portion 41 is disposed in the cavity 6 of the tube 2, as shown in FIG. 17, such that the shoulder 63 abuts the end 3 of the tube 2. A first end 53 of the tubular portion 41 is disposed in the cavity 6 proximal the second ends 17 of the jaw members 14 and 15 of the jaw assemblies 10 and 11. The funnel guides 40 and 48 are open-ended to allow the cables 12 and 13 to pass therethrough during installation. The funnel guides 40 and 48 are pushed outside the tube 2 after full insertion of the cables 12 and 13 to provide further visual indicator of a successful insertion. Preferably, the funnel guides 40 and 48 are made of plastic, although any suitable material can be used, and are unitarily formed as a single piece.

Figure 19:
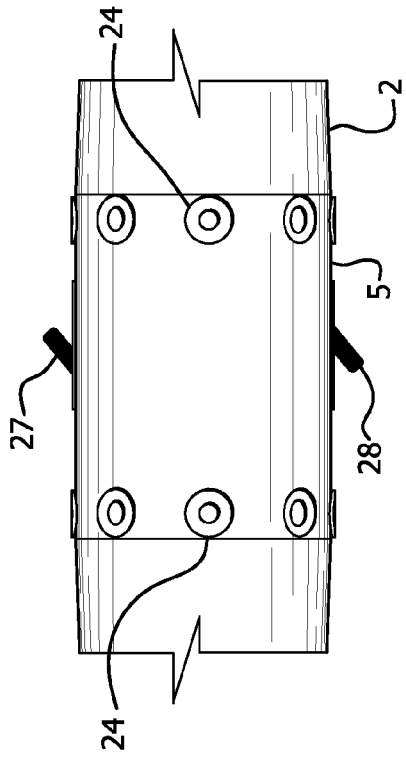
FIG. 19 is a partial side elevational view of the cable connector of FIG. 1 showing exposed indicator arms.
Figure 21:
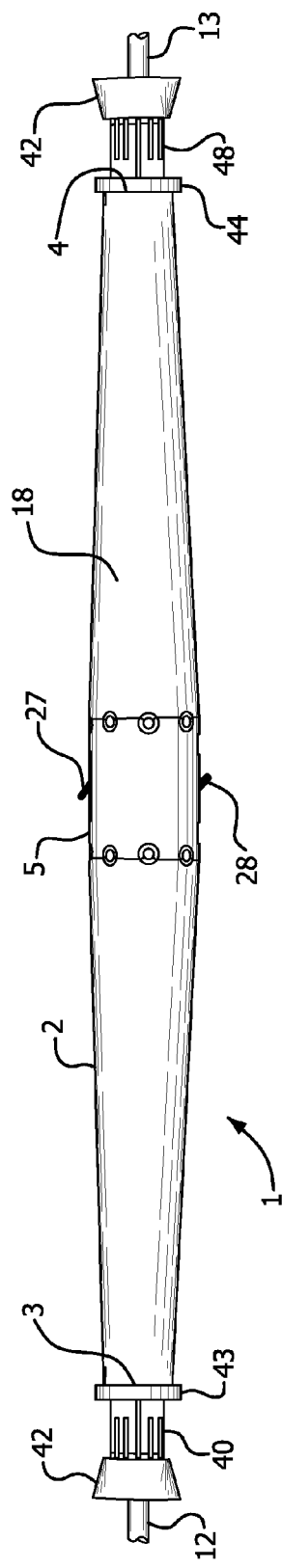
FIG. 21 is a side elevational view of the cable connector of FIG. 1 after first and second cables are fully inserted.
Figure 22:
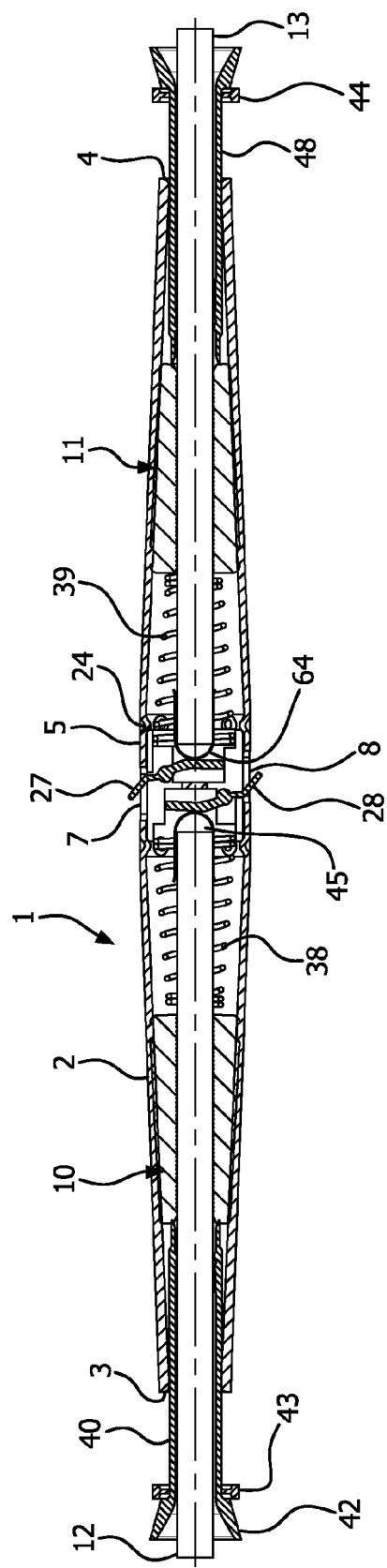
FIG. 22 is a side elevational view of the cable connector of FIG. 22 after expansion of the spring members.

First and second identification rings 43 and 44 can be disposed at the ends 3 and 4 of the tube 2, as shown in FIGS. 18, 19 and 21. The rings 43 and 44 can be color-coded to identify the size of the cables 12 and 13 connected together by the cable connector 1. The identification rings 43 and 44 are free to move between the funnel guides 40 and the ends 3 and 4 of the tube 2, as shown in FIG. 22.

Figures 15, 16:
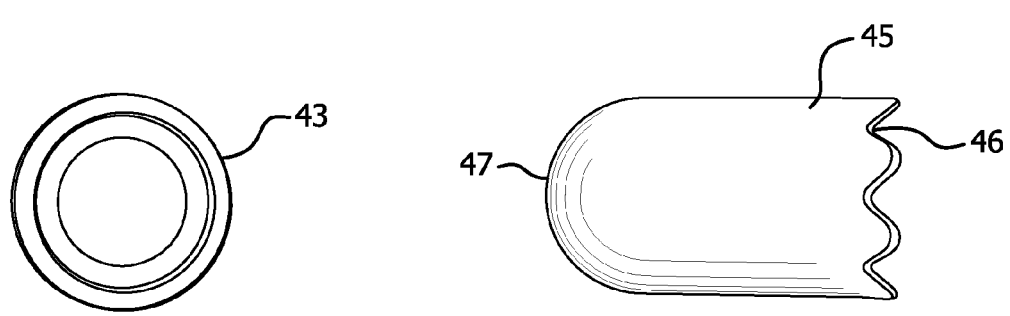
FIG. 15 is a front elevational view of a first identification ring of the cable connector of FIG. 1.
FIG. 16 is a side elevational view of a pilot cup for a cable received by the cable connector of FIG. 1.

First and second pilot cups 45 and 64 are disposed in the cavity 6 of the tube 2 to receive the first and second cables 12 and 13, as shown in FIGS. 17 and 21, and are releasably coupled to the end of funnel guides 40 and 48 located inside the tube 2. The first and second pilot cups 45 and 64 are preferably substantially identical. The first pilot cup 45 is preferably a substantially hemispherically shaped or nosed cylinder having an open end 46 and a closed end 47, as shown in FIG. 16. The pilot cups 45 and 64 are preferably made out of stainless steel or plastic and are unitarily formed as a single piece.

Assembly and Operation

The assembled automatic splice, or cable connector, 1 is shown in FIGS. 1 and 21-23. Prior to fully inserting cables 12 and 13, the first and second indicators, or arm members, 27 and 28 are disposed within the cavity 6 of the tube 2, as shown in FIG. 17, such that the indicators 27 and 28 are not visible externally of the tube 2, thereby indicating that the cables 12 and 13 are not fully inserted. Additionally, the conical end portions 42 of the first and second funnel guides 40 and 48 abut the ends 3 and 4 of the tube 2, thereby further indicating that the cables 12 and 13 are not fully inserted.

The assembled centerstop assembly 22 is shown in FIG. 12. First and second indicators 27 and 28 are connected to the centerstop 23 such that the sockets 33 of the first and second indicators are received between the pairs of ball members 25 and 26 (FIG. 8), respectively. The first and second indicators 27 and 28 are pivotable about the ball members 25 and 26 between first, unexposed, and second, exposed, positions, as shown in FIGS. 17 and 21. Stop members 35 and 36 substantially prevent unintended pivoting movement of the first and second indicators 27 and 28 about the ball members 25 and 26. A plurality of inwardly extending dimples 24 in the center portion 5 of the tube 2 locate the centerstop 23 in the cavity 6, as shown in FIGS. 18 and 20.

The first and second spring members 38 and 39 are disposed in the cavity 6 of the tube 2, as shown in FIG. 17. The second end 62 of the first spring member 38 abuts an end 71 (FIG. 12) of the centerstop 23, as shown in FIG. 17. A second end 72 of the second spring member 38 abuts a second end 73 (FIG. 8) of the centerstop 23.

The first and second jaw assemblies 10 and 11 are then inserted in the cavity 6. The jaw assemblies 10 and 11 taper inwardly toward the first and second ends 3 and 4 of the tube 2, respectively. The first tabs 78 of the first and second jaw members 14 and 15 engage the corresponding recesses 81 of the other jaw member, and the second tabs 78 of the first and second jaw members 14 and 15 engage the corresponding recesses 80 of the other jaw member such that the jaw assemblies 10 and 11 move together axially through the cavity 6 of the tube 2. The tube 2 of the connector 1 is then swaged around the jaw assemblies 10 and 11 such that the tube tapers toward the first and second ends 3 and 4 from the center portion 5. The first end 61 of the first spring member 38 engages the first end 16 of the jaw assembly 10, as shown in FIG. 17. The first end 74 of the second spring member 39 engages the first end of the second jaw assembly 10.

The first and second pilot cups 45 and 64 are preassembled in and releasably coupled to the first end 53 of the funnel guides 40 and 48, as shown in FIG. 17. The funnel guide and pilot cup subassemblies are pushed into the ends 3 and 4 of the tube 2. The pilot cups 45 and 64 enter the front openings 75 of the jaw assemblies 10 and 11. In the first, or initial, position before receiving a cable, the pilot cups 45 and 64 are disposed in the tube cavity 6 between the jaw members of the jaw assemblies 10 and 11, thereby keeping the jaw assemblies open. The pilot cups 45 and 64 disposed between the jaw members of the jaw assemblies 10 and 11 increases the diameter of the jaw assembly, thereby preventing the first and second spring members 38 and 39 from pushing the jaw assemblies into the tapered portion of the tube 2. The first and second funnel guides 40 and 48 are open-ended to allow the cables 12 and 13 to pass therethrough.

The first cable 12 is inserted in the connector 1 through the open end 3 of the tube 2, as shown in FIGS. 22 and 30. The first cable 12 penetrates the first funnel guide 40 and engages the open end 46 of the first pilot cup 45 disposed in the first end 53 thereof. Once the first cable 12 and the pilot cup 45 are engaged, the pilot cup 45 nests against the end of the cable such that the open end 46 surrounds the cable 12 and keeps the individual strands of the cable from separating. A small force is required to push the first cable 12 into the pilot cup 45 and advances the closed end 47 towards the center of the connector 1, transporting the first cable 12 towards a center of the tube 2.

The first cable 12 is then pushed with the first pilot cup 45 through the length of the first jaw assembly 10. As the first pilot cup 45 is pushed toward the center of the tube 2, the first pilot cup 45 passes through and out of the first jaw assembly 10. When the first pilot cup 45 exits the first jaw assembly 10, the loaded first spring member 38 is allowed to expand to push the first jaw assembly 10 into the tapered portion of the tube 2.

As the first pilot cup 45 exits the first jaw assembly 10, the first pilot cup 45 passes through the first spring member 38 and engages the pad portion 32 of the first arm member 27, as shown in FIG. 21. The movement of the first pilot cup 45 toward the center of the tube 2 causes the pad portion 32 to pass over the stop member 36, thereby pivoting the arm 34 out through the indicator opening 7 in the tube 2, as shown in FIG. 23, to indicate full insertion of the cable 12.

When the first pilot cup 45 is pushed out of the first jaw assembly 10, the first spring member 38 releases its stored energy and pushes the jaw members 14 and 15 of the first jaw assembly 10 through the tapered portion of the tube and toward the end of the tube 3. The jaw members 14 and 15 have an inner cable gripping surface with grip enhancing features such as a series of teeth, or other surface texture, which bite into the opposed surface of the cable or cable.

Prior to cable insertion, the stop members 35 and 36 engage inner surfaces 37 of the pad portions 32 of the arm members 27 and 28 such that the arms 34 thereof are not visible externally of the tube 2, as shown in FIG. 1. The stop members 35 and 36 substantially prevent unintended pivotal movement of the arm members 27 and 28 about the ball members 25 and 26. The arms 34 of the arm members 27 and 28 not being visible externally of the tube 2 indicates that the cables 12 and 13 have not been fully inserted.

The movement of the first jaw assembly 10 toward the first end 3 of the tube 2 causes the first funnel guide 40 to move further out of the tube 2 to further indicate that the first cable 12 is fully inserted. The tapered end of the first jaw assembly 10 strikes the first end 53 of the first funnel guide 40, thereby pushing the first funnel guide out of the tube 2 to further indicate full insertion of the first cable 12, as shown in FIGS. 22 and 23. The first funnel guide 40 is pushed out of the first end 3 of the tube 2 such that the frusto-conical portion 59 is spaced from the first end 3 of the tube 2.

Insertion of the second cable 13 is accomplished in a substantially similar manner as the first cable 12. The second cable 13 is inserted such that the second pilot cup 64 is released from the second jaw assembly 11. The second spring member 39 pushes the second jaw assembly 11 and the second funnel guide 48 toward the second end 4 of the tube 2, as shown in FIGS. 22 and 23. The second pilot cup 64 engages the pad portion of the second indicator 28, thereby pivoting the second indicator about the ball members 26 such that the arm 34 of the second indicator pivots out through the slot 8 in the tube 2. The second indicator 28 is visible externally of the tube 2, thereby indicating full insertion of the second cable 13. Additionally, the second funnel guide 48 is pushed out of the second end 4 of the tube 2, such that the frusto-conical portion 42 is spaced from the second end 4 of the tube 2, as shown in FIGS. 22 and 23.

While advantageous embodiments have been chosen to illustrate the invention, it will be understood by those skilled in the art that various changes and modifications may be made therein without departing from the scope of the invention as defined in the appended claims and their equivalents.

What is claimed is:

1. A cable connector, comprising:
a body member having a cable opening to receive a cable and an indicator opening;
an indicator movable between first and second positions; and
a stop member releasably engaging and substantially preventing unintended movement of said indicator from said first position to said second position, said indicator moving past said stop member and through said indicator opening in said body member when moving from said first position to said second position and being exposed externally of said body member to indicate full insertion of the cable.

2. The cable connector according to claim 1, wherein said indicator has a first portion engagable by the cable and a second portion visible externally of said body member when said indicator is in said second position.

3. The cable connector according to claim 2, wherein said indicator pivots between said first and second positions.

4. The cable connector according to claim 1, wherein a pilot cup is disposed in a jaw assembly when said indicator is in said first position to substantially prevent movement of said jaw assembly.

5. The cable connector according to claim 4, wherein said pilot cup is disposed externally of said jaw assembly when said indicator is in said second position.

6. The cable connector according to claim 5, wherein a spring member biases said jaw assembly toward an open end of the body member when said pilot cup is disposed externally of said jaw assembly.

7. The cable connector according to claim 1, wherein a funnel guide has a substantially frusto-conical portion disposed externally of said body member and a substantially tubular portion disposed in said body member.

8. The cable connector according to claim 7, wherein said substantially frusto-conical portion of said funnel guide abuts an end of said body member when said indicator is in said first position, and said substantially frusto-conical portion of said funnel guide is spaced from said end of said body member when said indicator in said second position to further indicate full insertion of the cable.

9. A cable connector, comprising:
a body member having a cable opening to receive a cable and an indicator opening;
a centerstop disposed in said body member and having a pivot member;
an indicator movably connected to said pivot member and pivotable between first and second positions; and
a stop member connected to said centerstop to substantially prevent unintended movement of said indicator from said first position to said second position, said indicator pivoting past said stop member and through said indicator opening in said body member when moving from said first position to said second position and being exposed externally of said body member to indicate full insertion of the cable.

10. The cable connector according to claim 9, wherein said stop member is disposed rearwardly of said pivot member in an axial direction of said body member.

11. The cable connector according to claim 9, wherein first and second pluralities of protrusions extend inwardly and circumferentially around said body member, and said centerstop is disposed between said first and second pluralities of protrusions.

12. The cable connector according to claim 9, wherein a funnel guide has a substantially frusto-conical portion disposed externally of said body member and a substantially tubular portion disposed in said body member.

13. The cable connector according to claim 12, wherein said substantially frusto-conical portion of said funnel guide abuts an end of said body member when said indicator is in said first position, and said substantially frusto-conical portion of said funnel guide is spaced from said end of said body member when said indicator in said second position to further indicate full insertion of the cable.

14. A cable connector, comprising:
a body member having a cable opening to receive a cable and an indicator opening;
a centerstop disposed in said body member and having a pivot member;
an indicator movably connected to said pivot member and pivotable between first and second positions;
a stop member connected to said centerstop to substantially prevent unintended movement of said indicator from said first position to said second position, said indicator pivoting past said stop member and through said indicator opening in said body member when moving from said first position to said second position and being exposed externally of said body member to indicate full insertion of the cable;
a jaw assembly movably disposed in said body member between a first position and a second position; and
a spring member disposed in said body member between said centerstop and said jaw assembly, said spring member biasing said jaw assembly to said second position.

15. The cable connector according to claim 9, wherein said indicator includes a socket engaging said pivot member.

16. The cable connector according to claim 9, wherein said indicator includes an arm and a pad.

17. The cable connector according to claim 14, wherein the body includes a second indicator opening offset from the indicator opening.

18. The cable connector according to claim 14, wherein the body includes a second indicator opening aligned with the indicator opening.

19. The cable connector according to claim 14, wherein said indicator includes an arm, a pad, and a socket.

20. The cable connector according to claim 14, wherein said stop engages said indicator in the first position.

* * * * *